United States Patent [19]

Ohmura

[11] 4,141,132
[45] Feb. 27, 1979

[54] METHOD OF MANUFACTURING A LINE GUIDE RING FOR FISHING RODS

[75] Inventor: Ryuichi Ohmura, Shizuoka, Japan

[73] Assignee: Fuji Kogyo Co., Ltd., Japan

[21] Appl. No.: 848,014

[22] Filed: Nov. 2, 1977

[51] Int. Cl.² .................. B23P 11/00; A01K 87/04
[52] U.S. Cl. ........................................ 29/432; 43/24
[58] Field of Search ............ 29/432, 451, 453, 446; 43/24

[56] References Cited

U.S. PATENT DOCUMENTS

| | | | |
|---|---|---|---|
| 1,923,263 | 8/1933 | Heddon | 43/24 |
| 2,561,675 | 7/1951 | Ross | 43/24 |
| 2,700,579 | 1/1955 | Scott | 43/24 UX |
| 3,171,228 | 3/1965 | Cwik | 43/24 |
| 3,290,772 | 12/1966 | Crouch | 29/432 X |
| 4,011,680 | 3/1977 | Rienzo, Jr. | 43/24 |
| 4,051,618 | 10/1977 | Ohmura | 43/24 |

Primary Examiner—Victor A. DiPalma
Attorney, Agent, or Firm—Holman & Stern

[57] ABSTRACT

Disclosed herein is a novel method of manufacturing a line guide ring for fishing rods which comprises providing a suitable number of prongs on the inner periphery of a fixed ring, fitting a shock ring into said inner periphery and piercing said shock ring with said prongs by fitting a guide ring thereinto, whereby the three ring members are firmly held. This method renders it possible to facilitate the production of a line guide ring of good quality which does neither become loose upon mounting to a fishing rod nor rotate thereon.

3 Claims, 4 Drawing Figures

METHOD OF MANUFACTURING A LINE GUIDE RING FOR FISHING RODS

BACKGROUND OF THE INVENTION

In a conventional line guide ring in which a guide ring is fitted into a fixed ring through a chock ring, a recessed groove into which the fixed ring is to be fitted must be provided on the outer periphery of the shock ring. Otherwise a groove is formed on the outer periphery of the guide ring so as not to permit easy disengagement of the respective members.

As the aforesaid groove is needed, such a line guide ring requires not only the formation of such a groove, but also some fitting means in its assembly since it is not mounted merely by press fitting. On the other hand, this guide ring is disadvantageous in that, when there is only a slight difference in dimensions of the respective ring members, it becomes loose upon mounting to a fishing rod, thus becoming rickety or resulting in revolution of the guide ring.

SUMMARY OF THE INVENTION

In accordance with the present invention, such a disadvantage is obviated by a method of manufacturing a line guide ring for fishing rods which comprises providing a suitable number of prongs on the inner periphery of a fixed ring, fitting a shock ring into said inner periphery and piercing said shock ring with said prongs by fitting a guide ring thereinto, whereby the three ring members are firmly held.

BRIEF DESCRIPTION OF THE DRAWINGS

While the invention is particularly pointed out and distinctly claimed in the concluding portion of the specification, a preferred embodiment is described in the following detailed description, which may be best understood when read in connection with the accompanying drawings in which:

PREFERRED EMBODIMENT OF THE INVENTION

Figure 1:
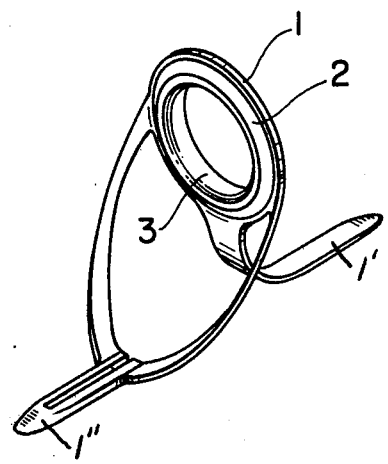
FIG. 1 is a perspective view of one preferred embodiment of the present invention.
Figure 2:
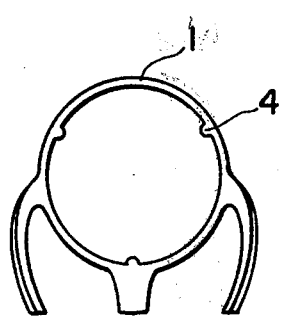
FIG. 2 is a front view of a fixed ring having three prongs on its inner periphery.
Figure 3:
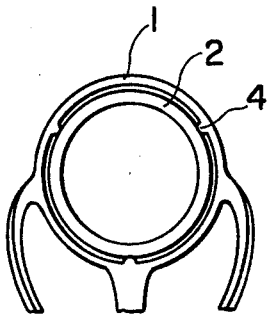
FIG. 3 is a front view of the fixed ring having a shock ring fitted into its inner periphery.

Referring now to the drawings, a fixed ring indicated generally by numeral 1 is connected to a support leg 1' and a mounting leg 1". The mounting leg 1" is firmly wound around a fishing rod by a fine thread for fixing thereto. Numeral 2 designates a shock ring made of an elastic material such as polyethylene, and 3 designates a guide ring having a circular aperture therein, which is formed of a super-hard material such as ceramics.

Figure 4:
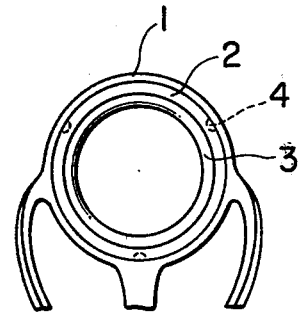
FIG. 4 is a front view of the fixed ring in which a guide ring is fitted through the shock ring by press fitting.

Referring to FIG. 4 showing one embodiment of the present invention, prongs 4 are provided at two or more positions on the inner periphery of the fixed ring 1 (the figure shows a state where prongs are provided at three position). The shock ring 2 is formed such as to have an outer diameter substantially equal to that of the inscribe circle of prongs 4, and is fitted into the inner periphery of the fixed ring 1.

The guide ring 3 is formed in such a way to have an outer diameter larger than the inner diameter of the shock ring 2, and is urged into the inner periphery of the shock ring 2 by means of a press, so that the ring 3 is fitted into the fixed ring 1. Thus, the shock ring 2 is instantaneously enlarged by the guide ring 3 to make larger the outer diameter thereof, and is urged strongly against the fixed ring to thereby pierce the shock ring 2 with prongs 4.

As a result, the shock ring 2 comes into close contact with the inner periphery of the fixed ring 1, and is, therefore, held thereon. On the other hand, the guide ring 3 is also held on the inner periphery of the shock ring 2.

The present invention permits the prongs provided on the inner periphery of the fixed ring to pierce the shock ring to thereby hold the shock ring and guide ring, and hence, eliminates the need for forming a groove on the shock ring. In addition, the line guide ring of the present invention can be mounted only by press fitting or butting process, resulting in facilitation of its production. Thus, the present invention provides a line guide ring of good quality which does neither become rickety or loose upon mounting to a fishing rod nor rotate thereon since the prongs encroach against the shock ring.

Although a preferred embodiment of the present invention has been shown in the foregoing specification, it will, of course, be understood that various modifications and changes may be made therein without departing from the invention. It is, therefore, intended that the following claims cover all such modifications and changes as may fall within the true spirit and scope of the present invention.

What is claimed is:

1. A method of manufacturing a line guide ring assembly for fishing rods comprising fitting an elastic shock ring into a fixed ring, said fixed ring having an inner periphery formed with at least two inwardly directed prongs, and pressing a guide ring into said shock ring, said guide ring having an outer diameter larger than the inner diameter of said shock ring, said guide ring thereby enlarging said shock ring and causing said prongs to pierce said shock ring to hold the rings in an assembled condition.

2. A method of manufacturing a line guide ring assembly for fishing rods as claimed in claim 1 in which the fixed ring has three of said prongs.

3. A method of manufacturing a line guide ring assembly for fishing rods as claimed in claim 2 in which said guide ring is formed of ceramics material.

* * * * *